United States Patent

Lee

[15] 3,673,326

[45] June 27, 1972

[54] COMMUNICATION SYSTEM

[72] Inventor: Francis F. Lee, 35 Highland Ave., Lexington, Mass. 02173

[22] Filed: Aug. 17, 1970

[21] Appl. No.: 64,374

[52] U.S. Cl. .......................................................178/71 R
[51] Int. Cl. .......................................................H04l 25/40
[58] Field of Search .......................................178/71 R, 70 R

[56] References Cited

UNITED STATES PATENTS

| | | | |
|---|---|---|---|
| 3,410,957 | 11/1968 | Schiebeler | 178/71 R |
| 3,499,985 | 3/1970 | Rowlands | 178/70 R |

*Primary Examiner*—Kathleen H. Claffy
*Assistant Examiner*—William A. Helvestine
*Attorney*—Willis M. Ertman

[57] ABSTRACT

A bilateral repeater for connection in a transmission line arranged to transmit data between two spaced points includes a network having two inputs and two outputs. Each output is connected to a corresponding input at a terminal arranged for connection to the transmission line. The repeater also includes bilateral circuitry responsive to an initiating data signal applied via either of the terminals to an input for transmitting a corresponding data signal via an output to the other of the terminals only as long as the initiating data signal continues to be applied at the first terminal, and the bilateral circuitry includes an inhibiting circuit for preventing transmission of corresponding data signals if initiating data signals are applied at both of the terminals at the same time.

21 Claims, 4 Drawing Figures

COMMUNICATION SYSTEM

SUMMARY OF INVENTION

This invention relates to bi-directional data communication systems.

For the transmission and reception of digital data in computers and communication systems, a bi-directional data bus system is often used to allow both transmission and reception of data. More than two stations may be connected to such a transmission bus and the role of transmitter and receiver may be exchanged among the various stations as long as there in not more than one station transmitting at a given time.

In a data bus system for transmitting digital data between computers or similar devices, the receiving amplifiers are usually designed to present a relatively high impedance so as not to disturb excessively the impedance match of the data bus transmission system. However, as more stations are added to the bus system, the cumulative effect of the receiving amplifier loading on the impedance match can cause excessive reflections and make reliable reception difficult. Furthermore, as the physical length of the bus increases, the signal amplitude on the bus will be attenuated. Excessive attenuation also will cause unreliable reception. For these situations it is desirable to provide a repeater to extend the bus capability. Since the bus is bi-directional or bi-lateral, such a repeater must be capable of amplifying signals in both directions. However, the repeater arrangement must, for example, not produce a permanently latched condition due to positive feedback action.

It is an object of this invention to provide a bi-directional bus repeater which is free from any such latching conditions.

Another object of the invention is to provide an improved repeater for bi-directional digital data transmission systems.

Another object of the invention is to provide a novel and improved bi-directional or bi-lateral digital data transmission system in which digital data may be transferred over a common transmission line in both directions economically and reliably.

In accordance with the invention there is provided a bi-directional repeater for connection in a transmission line arranged to transmit data between two spaced points that includes a network having two inputs, and two outputs. Each output is connected to a corresponding input at a terminal arranged for connection to the transmission line. The repeater also includes bilateral circuitry responsive to an initiating data signal applied via either of the terminals to an input for transmitting a corresponding data signal via an output to the other of the terminals only as long as the initiating data signal continues to be applied at the first terminal, and the bilateral circuitry includes an inhibiting circuit for preventing transmission of corresponding data signals if initiating data signals are applied at both of the terminals at the same time.

In preferred embodiments the inhibiting circuit includes circuitry for preventing transmission of the corresponding data signals in either direction until no inhibiting data signal is applied at either terminal. Also, the bilateral circuitry includes two symmetrical sections, each section including a logic control circuit responsive to signals from both of the inputs and a binary logic transducing component responsive to signals from both control circuits and signals from its corresponding input.

The invention may be realized in a number of forms, for example the transducing components may be relay devices or digital driver logic such as NAND circuits. The transmission line may have a plurality of sending and receiving stations connected to it in parallel. A series version of the repeater of the invention may be inserted in a series loop such as is employed in teletype transmission to increase the size of the loop or used to interconnect two such series loops. The invention may be defined in terms of a network that has inputs A and B to which initiating data signals are applied and outputs C and D to which the output data signals from the transducing components are applied. Output C is directly connected to input A and output D is directly connected to input B. The two auxiliary control circuits in the network produce the control outputs $Y_1$ and $Y_2$, respectively, which are related to initiating data signals applied at terminals A and B as set out in the following state flow diagram:

| | | A,B | | | |
|---|---|---|---|---|---|
| | | 11 | 10 | 01 | 00 |
| $Y_1$, $Y_2$ | 00 | 00 | 10 | 01<br>D=O | I<br>D=O |
| | 01 | 00 | 01<br>C=O | 01 | 01<br>C=O |
| | 10 | 00 | 10 | 10 | 10 |
| | 11 | II | III | IV | V |

A stable condition is one in which $Y_1Y_2$ is identical to the table entry. For example, if from stable condition (AB = 11; $Y_1Y_2$ = 00) AB changes to 10 (column two), the entry in the table indicates that the next $Y_1Y_2$ condition is 10 (row three) and in that stable condition the C=0 output is produced (C and D are 1 except as indicated).

As set out in the state flow diagram, in a steady state condition, both input signals A and B are ONE and both auxiliary control circuit output signals ($Y_1$ and $Y_2$) are ZERO. An initiating data signal at terminal A changes the AB condition from 11 (column one) to 01 (column three) and that change causes the $Y_2$ signal to switch from the 0 to 1 (row two). That transition in turn produces a ZERO output on the D line. As that line is directly connected to the B line, the AB condition changes to 00 (column four), thus transmitting the data signal from the B terminal in response to the initiating data signal applied at the A terminal while the $Y_1Y_2$ signal condition is maintained. When the initiating data signal terminates at the A terminal, the AB signal changes to 10 (column two), and that transition causes the D output signal to change from 0 to 1 so that the AB signal returns to 11 (column one) and the $Y_1$, $Y_2$ signal condition returns to 00.

Conversely, if the initiating signal is applied at terminal B, a 10 condition (column two) is established and the $Y_1$, $Y_2$ signal becomes 10 (line three) which in turn produces a ZERO output on line C which is connected to terminal A so that the AB condition becomes 00 (column four). When the initiating B signal terminates, the AB condition becomes 01 (column three), the C signal becomes 1 causing the AB condition to become 11, and the $Y_1$ signal returns to 0 (column one) to return to the stable state in the upper lefthand corner of the diagram.

The item (I) in the fourth column in the first row of the state flow diagram and the four items (II–V) in fourth row of the state flow diagram are selected to avoid unstable or latched conditions. While all five items might be given any excitation value, 1,024 possibilities in all, the requirement that the network be completely symmetrical and bilateral reduces the possibilities to 32 and it is preferred that one of the following 22 be utilized, thus eliminating possible oscillatory conditions and dead states:

TABLE I

| | I | II | III | IV | V |
|---|---|---|---|---|---|
| 1 | 00 | 00 | 00 | 00 | 00 |
| 2 | 00 | 00 | 00 | 00 | 11 |
| 3* | 00 | 00 | 00 | 10 | 00 |
| 4* | 00 | 00 | 01 | 10 | 11 |
| 5 | 00 | 00 | 10 | 01 | 00 |
| 6 | 00 | 00 | 10 | 01 | 11 |
| 7 | 00 | 00 | 11 | 11 | 00 |
| 8 | 00 | 00 | 11 | 11 | 11 |
| 9 | 00 | 11 | 00 | 00 | 00 |
| 10 | 00 | 11 | 00 | 00 | 11 |
| 11* | 00 | 11 | 01 | 10 | 00 |
| 12* | 00 | 11 | 01 | 10 | 11 |
| 13 | 00 | 11 | 10 | 01 | 00 |
| 14 | 00 | 11 | 10 | 01 | 11 |
| 15 | 00 | 11 | 11 | 11 | 00 |
| 16 | 11 | 00 | 00 | 00 | 11 |

| | | | | | |
|---|---|---|---|---|---|
| 17* | 11 | 00 | 01 | 10 | 11 |
| 18 | 11 | 00 | 10 | 01 | 11 |
| 19 | 11 | 00 | 11 | 11 | 11 |
| 20 | 11 | 11 | 00 | 00 | 11 |
| 21* | 11 | 11 | 01 | 10 | 11 |
| 22 | 11 | 11 | 10 | 01 | 11 |

In these arrangements, when initiating data signals are applied to both terminals A and B simultaneously, no transmission can take place either way. In the six logic arrangements indicated by asterisks, transmission in either direction is inhibited until no initiating data signal is applied to either the A or B terminals, while the other arrangements indicated in Table I permit repeater transmission to commence as soon as one initiating data signal has terminated.

The invention provides a network in the nature of a repeater circuit for use with a single transmission line to transfer digital signals from one location to another in a bi-directional or bilateral sense. It provides an economical data transfer system which appreciably reduces the number of data transmission lines required between spaced locations and permits enlargement of bus capability in an economical manner that permits regeneration and reshaping of output data signals corresponding to the initiating data signal.

Other objects, features and advantages of the invention will be seen as the following description of particular embodiments progresses in conjunction with the drawing, in which.

DESCRIPTION OF PARTICULAR EMBODIMENTS

Figure 1:
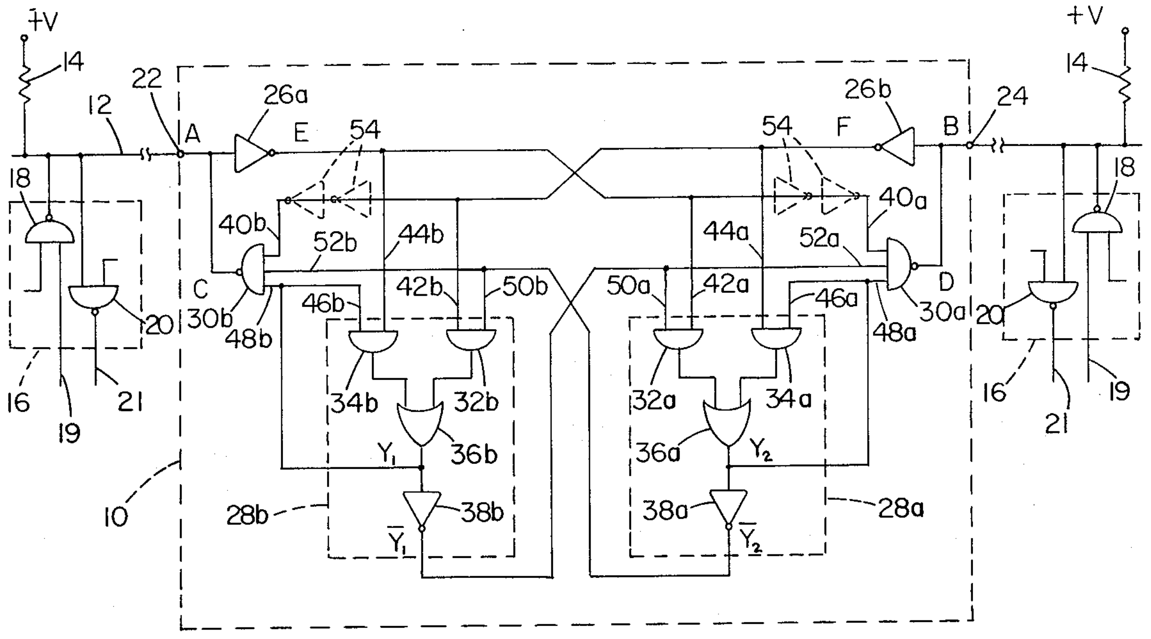
FIG. 1 is a logic diagram of a digital data transmission system constructed in accordance with the invention.

There is shown in FIG. 1 a repeater network 10 which extends the capability of the single line transmission bus 12. A typical binary data transmission system would use a plurality of such buses in parallel. Each transmission line 12 is terminated at both ends in its characteristic impedance 14 to minimize reflections due to impedance mismatch. Each station 16 coupled to bus 12 includes a logical driver sending amplifier 18, an example of which is the commonly used diode transistor logic type 944 NAND circuit and a similar receiving amplifier 20. When no station is transmitting all the sending amplifiers 16 are in the off state with the bus 12 at the +V potential. When a station is selected for transmitting, a logical one at the input 19 of the sending amplifier 18 will turn it on, thus grounding the bus. A logical zero at the input 19 will leave the bus 12 at the +V potential. When a station is selected for receiving, the logical state of the bus is gated and the transmitted logical level appears at the output 21 of the station receiving amplifier 20.

Repeater 10 includes two input terminals 22, 24 and two cross-coupled symmetrical driver circuits. Each driver circuit includes an inverter 26 to which a signal is applied from its corresponding input terminal, an auxiliary control circuit 28, and a DTL logic driver transducing component 30 (a NAND circuit with open collector). Each auxiliary control circuit includes two AND-circuits 32, 34, and OR-circuit 36 and an inverter 38. The output of each inverter 26 is applied to input 40 of driver 30, input 42 of AND-circuit 32 of one auxiliary circuit 28, and input 44 of AND-circuit 34 in the other auxiliary circuit 28. The outputs of the two AND circuits in each circuit 28 are applied to OR-circuit 36 and its output ($Y_1$ or $Y_2$) is applied to inverter 38 to produce the corresponding $\overline{Y_1}$ of $\overline{Y_2}$ output. The output of OR circuit 36 is also applied to the second input 46 of its AND-circuit 34, and to the input 48 of its NAND driver circuit 30. The output from each inverter 38 is cross-coupled to the second input 50 of AND-circuit 32 and to input 52 of the other NAND-circuit 30. The output of driver 30*a* is connected directly to terminal 24 and the output of driver 30*b* is connected directly to terminal 22. Two inverters 54 may be connected between each inverter 26 and the input 40 of the corresponding driver 30 for equalizing the bus repeater signal rise and fall delays. This network is represented by the following state flow diagram:

| | | A,B 11 | 10 | 01 | 00 |
|---|---|---|---|---|---|
| $Y_1Y_2$ | 00 | 00 | 10 | 01 | 11 |
| | 01 | 00 | 01 | 01 | 01 |
| | 10 | 00 | 10 | 10 | 10 |
| | 11 | 00 | 01 | 10 | 11 |

When no station 16 is transmitting, both terminal 22 and terminal 24 are at +V potential and thus the outputs (E,F) of both inverters 26 are false (at ground potential) and the outputs ($Y_1$, $Y_2$) of both OR-circuits 36 are also false. Since the output D of logical driver 30a is $(\overline{E\,\overline{Y_1}\,Y_2})$ and the output C of logical driver 30b is $(\overline{F\,\overline{Y_1}\,Y_2})$ both drivers 30 are turned off and thus do not affect the state of the bus. When a station at the left of the repeater 10 commences transmission of logical ONE, the input 22 is grounded thus making the output of inverter 26*a* true. Since $Y_2 = E\,\overline{Y_1} + F\,Y_2$, the $E\,\overline{Y_1}$ term makes the output of OR-circuit 36 ($Y_2$) true and as $\overline{Y_1}$ is true, driver 30a turns on, grounding terminal 24 and transmitting the signal to that portion of the bus 12 to the right of repeater 10.

This grounding of terminal 24 makes the output of inverter 26*b* true, allowing the F $Y_2$ input to OR-circuit 36*a* from AND-circuit 34*a* to latch that output of OR-circuit 36*a* to the true ($Y_2$) condition. The $\overline{Y_2}$ signal, cross-coupled to AND-circuit 32*b*, holds the output of OR-circuit 36*b* false and logical driver 30*b* remains turned off so that it does not affect the bus 12 to the left of repeater 10.

When the logical ONE signal from the sending driver 18 ends, voltage at terminal 22 returns to +V and the output of inverter 26*a* becomes false which turns off driver 30*a* passing the transition to terminal 24 so that it returns to +V. That signal is fed back, through inverter 26*b*, and causes the output of AND-circuit 34*a* to terminate the $Y_2$ output from OR-circuit 36*a* so that the repeater is returned to idle condition.

Similarly, should a logical ONE signal from a station at the right of repeater 10 be applied at terminal 24, the signal will be passed to the left bus via logical driver 30*b* and logical driver 30*a* will be held turned off.

Figure 2:
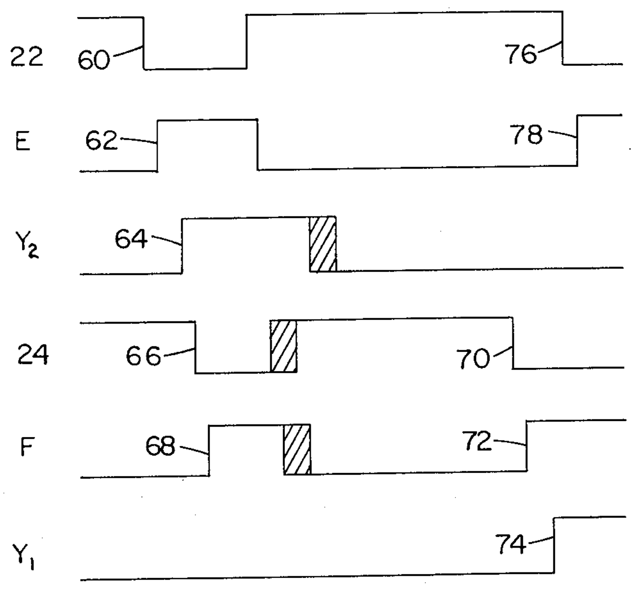
FIG. 2 is a timing diagram indicating the timing relation between signals in the circuit shown in FIG. 1.

The timing diagram in FIG. 2 illustrates a case in which a station to the left of the repeater 10 transmits a ONE followed by a station to the right transmitting a ONE in non-overlapping manner. In the control circuitry 28, type SN 7450 circuits were used as the AND-OR-INVERT combination; type SN 7400 circuits were used as inverters 26 and 54; the bus drivers 18 and 30 were DTL Type 944 logic (the drivers sharing a common collector resistor and effectively connected in OR relation); and the logical ONE (initiating data) signals were 100 nanoseconds in duration. The logical ONE 60 at terminal 22 causes inverter 26*a* to produce the E output 62, and in turn control circuit 28*a* produces the $Y_2$ output 64. The $Y_2$ output 64 turns on driver 30*a* and produces the output transition 66 at terminal 24. That transition is fed back through inverter 26b to produce the output 68 but OR-circuit 36*b* is latched out by the absence of the $\overline{Y_2}$ signal so no $Y_1$ signal is generated. When the logical ONE at terminal 22 ends, the E output 62 terminates, ending the logical ONE signal 64 at terminal 24. That signal transition terminates the F signal 68 and in turn the $Y_2$ signal 64. When a station to the right then applies a signal 70 to terminal 24, F signal 72 and $Y_1$ signal 74 are produced in turn generating the indicated output signal 76 at terminal 22. The shaded areas in FIG. 2 show the effect of adding pulse equalizing inverters 54.

Should two stations, one on each side of repeater 10, transmit a logical ONE signal at precisely the same time, both logic circuits 28*a* and 28*b* produce Y outputs so that both logical drivers 30a and 30b remain turned off. Driver 30a is released when the $Y_1$ signal terminates and driver 30b is released when the $Y_2$ signal terminates, thus preventing a bus latchup condition.

Figure 3:
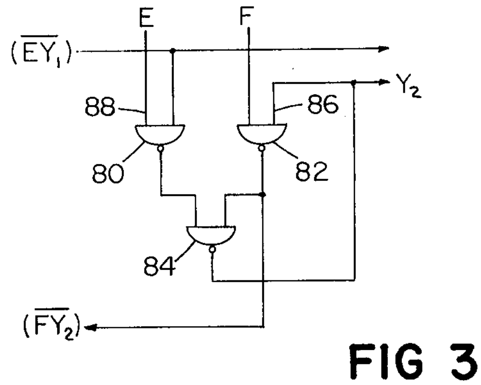
FIG. 3 is a modification of logic control circuit employed in the system shown in FIG. 1.

A modified auxiliary control circuit 28 is shown in FIG. 3. Three NAND-circuits 80, 82, and 84 (Type SN 7400) have been used in place of AND-circuits 32 and 34, OR-circuit 36 and inverter 38. The output of NAND-circuit 84 is applied to input 48 of driver 30 and input 86 of NAND-circuit 82 in manner similar to the application of the output of OR-circuit 36 in FIG. 1; and the output of NAND-circuit 82 is cross-coupled to input 88 of the other NAND-circuit 80 and to input 52 of driver 30 in a manner similar to the application of the output of inverter 38 in FIG. 1. This logic is represented by the same state flow diagram as the logic of FIG. 1.

Figure 4:
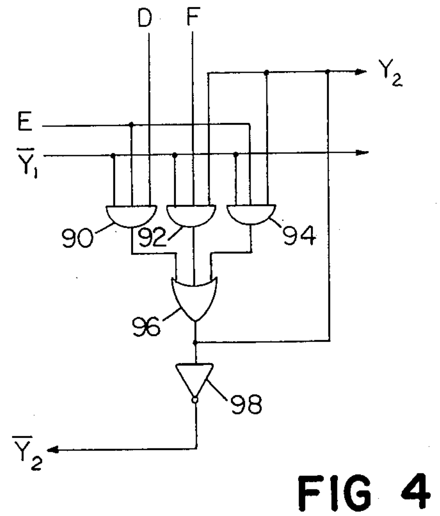
FIG. 4 is still another modification of a logic control circuit employed in the data transmission system shown in FIG. 1.

Still another modified auxiliary control circuit 28 is shown in FIG. 4, this circuit being represented by the following state flow diagram (the first item listed in Table I):

| | A,B 11 | 10 | 01 | 00 |
|---|---|---|---|---|
| $Y_1Y_2$ 00 | 00 | 10 | 01 | 00 |
| 01 | 00 | 01 | 01 | 01 |
| 10 | 00 | 10 | 10 | 10 |
| 11 | 00 | 00 | 00 | 00 |

Three AND-circuits 90, 92, and 94, an OR-circuit 96 and an inverter 98 are employed. The $Y_2$ output is applied to AND-circuits 92 and 94 while the $\overline{Y_2}$ output is cross-coupled to all the AND circuits in the other auxiliary control circuit.

While particular embodiments of the invention have been shown and described, various modifications will be apparent to those skilled in the art and therefore, it is not intended that the invention be limited to the disclosed embodiments or to details thereof and departures may be made therefrom within the spirit and scope of the invention as defined in the claims.

What is claimed is:

1. A bilateral repeater for connection in a transmission line arranged to transmit data between two spaced points comprising a network having two inputs, two outputs, each said output being connected to a corresponding input at a terminal arranged for connection to said transmission line and bilateral circuitry responsive to an initiating data signal applied via either of said terminals to an input for transmitting a corresponding data signal via an output to the other of said terminals only as long as the initiating data signal continues to be applied at the first terminal, said bilateral circuitry including an inhibiting circuit for preventing transmission of corresponding data signals if initiating data signals are applied at both of said terminals at the same time.

2. The repeater as claimed in claim 1 wherein said inhibiting circuit includes circuitry responsive to the application of initiating data signals at both of said terminals at the same time for preventing transmission of said corresponding data signals in either direction until no initiating data signal is applied at either of said terminals, so that the duration of a transmitted corresponding data signal is not abridged.

3. A bilateral repeater for connection in a transmission line arranged to transmit data between two spaced points comprising a network having two inputs, two outputs, each said output being connected to a corresponding input at a terminal arranged for connection to said transmission line and bilateral circuitry responsive to an initiating data signal applied via either of said terminals to an input for transmitting a corresponding data signal via an output to the other of said terminals only as long as the initiating data signal continues to be applied at the first terminal, said bilateral circuitry including two symmetrical sections, each section including a logic control circuit responsive to signals from both of said inputs, a binary logic transducing component responsive to signals from both of said logic control circuits and signals from its corresponding input, and an inhibiting circuit for preventing transmission of corresponding data signals if initiating data signals are applied at both of said terminals at the same time.

4. The repeater as claimed in claim 3 wherein each said logic control circuit includes means producing a first logical AND function between one input and the output of the other logic control circuit and a second logical AND function between the other input and its own output.

5. The repeater as claimed in claim 3 wherein each said transducing component is a digital logic device.

6. The repeater as claimed in claim 1 wherein said transmission line is a pair of conductors for transmitting binary data between digital data processing devices.

7. A bilateral repeater for connection in a transmission line arranged to transmit data between two spaced points comprising a network having two inputs, two outputs, each said output being connected to a corresponding input at a terminal arranged for connection to said transmission line and bilateral circuitry responsive to an initiating data signal applied via either of said terminals to an input for transmitting a corresponding data signal via an output to the other of said terminals only as long as the initiating data signal continues to be applied at the first terminal, said bilateral circuitry including two symmetrical sections, each section including an inverter connected to a corresponding input, a logic control circuit responsive to signals from both of said inverters, a binary logic transducing component responsive to signals from both of said logic control circuits and signals from its corresponding inverter, and an inhibiting circuit for preventing transmission of corresponding data signals if initiating data signals are applied at both of said terminals at the same time.

8. The repeater as claimed in claim 7 wherein said inhibiting circuit includes circuitry responsive to the application of initiating data signals at both of said terminals at the same time for preventing transmission of said corresponding data signals in either direction until no initiating data signal is applied at either of said terminals, so that the duration of a transmitted corresponding data signal is not abridged.

9. The repeater as claimed in claim 8 wherein said transmission line is a pair of conductors for transmitting binary data between digital data processing devices that include digital driver logic devices connected to said transmission line in logical OR relation with said transducing components.

10. The repeater as claimed in claim 9 wherein each said transducing component is a digital logic device selected from the class consisting of diode transistor logic (DTL) and transistor transistor logic (TTL) devices.

11. The repeater as claimed in claim 10 wherein each said logic control circuit includes means producing a first logical AND function between one input and the output of the other logic control circuit and a second logical AND function between the other input and its own output.

12. A bilateral repeater for connection in a transmission line arranged to transmit data between two spaced points comprising a network having data inputs A and B, data outputs C and D, data output C being connected to data input B at a first terminal arranged for connection to said transmission line, data output D being connected to data input A at a second terminal arranged for connection to said transmission line, and bilateral circuitry for producing control outputs $Y_1$ and $Y_2$ in response to data initiating signals applied at said first and second terminals as set out in the following state flow diagram (entries indicating next $Y_1$ $Y_2$ conditions):

| A,B 11 | 10 | 01 | 00 |
|---|---|---|---|

| | | | | | |
|---|---|---|---|---|---|
| $Y_1, Y_2$ | 00 | 00 | 10 | 01 | I |
| | 01 | 00 | 01 | 01 | 01 |
| | 10 | 00 | 10 | 10 | 10 |
| | 11 | II | III | IV | V |

where values I–V are related to one another as follows:

| | I | II | III | IV | V |
|---|---|---|---|---|---|
| 1 | 00 | 00 | 00 | 00 | 00 |
| 2 | 00 | 00 | 00 | 00 | 11 |
| 3 | 00 | 00 | 01 | 10 | 00 |
| 4 | 00 | 00 | 01 | 10 | 11 |
| 5 | 00 | 00 | 10 | 01 | 00 |
| 6 | 00 | 00 | 10 | 01 | 11 |
| 7 | 00 | 00 | 11 | 11 | 00 |
| 8 | 00 | 00 | 11 | 11 | 11 |
| 9 | 00 | 11 | 00 | 00 | 00 |
| 10 | 00 | 11 | 00 | 00 | 11 |
| 11 | 00 | 11 | 01 | 10 | 00 |
| 12 | 00 | 11 | 01 | 10 | 11 |
| 13 | 00 | 11 | 10 | 01 | 00 |
| 14 | 00 | 11 | 10 | 01 | 11 |
| 15 | 00 | 11 | 11 | 11 | 00 |
| 16 | 11 | 00 | 00 | 00 | 11 |
| 17 | 11 | 00 | 01 | 10 | 11 |
| 18 | 11 | 00 | 10 | 01 | 11 |
| 19 | 11 | 00 | 11 | 11 | 11 |
| 20 | 11 | 11 | 00 | 00 | 11 |
| 21 | 11 | 11 | 01 | 10 | 11 |
| 22 | 11 | 11 | 10 | 01 | 11 |

13. The system as claimed in claim 12 wherein the values I–V are related to one another as follows:

| | I | II | III | IV | V |
|---|---|---|---|---|---|
| 1 | 00 | 00 | 01 | 10 | 00 |
| 2 | 00 | 00 | 01 | 10 | 11 |
| 3 | 00 | 11 | 01 | 10 | 00 |
| 4 | 00 | 11 | 01 | 10 | 11 |
| 5 | 11 | 00 | 01 | 10 | 11 |
| 6 | 11 | 11 | 01 | 10 | 11 |

14. The system as claimed in claim 12 wherein the preferred values I–V are related to one another as follows:

| I | II | III | IV | V |
|---|---|---|---|---|
| 11 | 00 | 01 | 10 | 11 |

15. A bi-directional digital data transmission system comprising a common transmission line for transmitting digital data between two spaced points and a network connected in the transmission line between the two spaced points, said network including two terminals, two transducer components, each of said components having an input and an output and being connected to respond to an initiating data signal applied via one of said terminals to its input and apply a corresponding data signal via its output to the other of said terminals, two auxiliary control circuits, one control circuit being associated with each transducer component, and each said control circuit providing in response to an initiating data signal applied at one terminal, a first output that enables its associated transducer component to apply an output data signal at the other terminal as long as the initiating data signal continues to be applied at said one terminal, a second output that prevents the other transducing component from applying an output data signal to said one terminal as long as the initiating data signal continues to be applied at said one terminal, and a third output that enables the other transducing component to respond to an initiating data signal applied at said other terminal immediately after the initiating data signal ceases to be applied at said one terminal.

16. The system as claimed in claim 15 and further including an inverter connected in circuit between each said terminal and the input of the transducing component connected to respond to the initiating data signal applied to that terminal.

17. The repeater as claimed in claim 15 wherein said transmission line is a pair of conductors for transmitting binary data between digital data processing devices that include digital driver logic devices connected to said transmission line in logical OR relation with said transducing components.

18. The repeater as claimed in claim 17 wherein each said transducing component is a digital logic device selected from the class consisting of diode transistor logic (DTL) and transistor transistor logic (TTL) devices.

19. The data system as claimed in claim 15 wherein said auxiliary control circuits produce control outputs ($Y_1$, $Y_2$) as a function of initiating data signals (A, B) applied at said terminals in accordance with the following excitation table (entries indicating next $Y_1Y_2$ conditions):

| | | A,B 11 | 10 | 01 | 00 |
|---|---|---|---|---|---|
| $Y_1, Y_2$ | 00 | 00 | 10 | 01 | I |
| | 01 | 00 | 01 | 01 | 01 |
| | 10 | 00 | 10 | 10 | 10 |
| | 11 | II | III | IV | V |

where values I–V are related to one another as follows:

| | I | II | III | IV | V |
|---|---|---|---|---|---|
| 1 | 00 | 00 | 00 | 00 | 00 |
| 2 | 00 | 00 | 00 | 00 | 11 |
| 3 | 00 | 00 | 01 | 10 | 00 |
| 4 | 00 | 00 | 01 | 10 | 11 |
| 5 | 00 | 00 | 10 | 01 | 00 |
| 6 | 00 | 00 | 10 | 01 | 11 |
| 7 | 00 | 00 | 11 | 11 | 00 |
| 8 | 00 | 00 | 11 | 11 | 11 |
| 9 | 00 | 11 | 00 | 00 | 00 |
| 10 | 00 | 11 | 00 | 00 | 11 |
| 11 | 00 | 11 | 01 | 10 | 00 |
| 12 | 00 | 11 | 01 | 10 | 11 |
| 13 | 00 | 11 | 10 | 01 | 00 |
| 14 | 00 | 11 | 10 | 01 | 11 |
| 15 | 00 | 11 | 11 | 11 | 00 |
| 16 | 11 | 00 | 00 | 00 | 11 |
| 17 | 11 | 00 | 01 | 10 | 11 |
| 18 | 11 | 00 | 10 | 01 | 11 |
| 19 | 11 | 00 | 11 | 11 | 11 |
| 20 | 11 | 11 | 00 | 00 | 11 |
| 21 | 11 | 11 | 01 | 10 | 11 |
| 22 | 11 | 11 | 10 | 01 | 11 |

20. The system as claimed in claim 19 wherein the values I–V are related to one another as follows:

| | I | II | III | IV | V |
|---|---|---|---|---|---|
| 1 | 00 | 00 | 01 | 10 | 00 |
| 2 | 00 | 00 | 01 | 10 | 11 |
| 3 | 00 | 11 | 01 | 10 | 00 |
| 4 | 00 | 11 | 01 | 10 | 11 |
| 5 | 11 | 00 | 01 | 10 | 11 |
| 6 | 11 | 11 | 01 | 10 | 11 |

21. The system as claimed in claim 19 wherein the preferred values I–V are related to one another as follows:

| I | II | III | IV | V |
|---|---|---|---|---|
| 11 | 00 | 01 | 10 | 11 |

* * * * *

PO-1050
(5/69)

UNITED STATES PATENT OFFICE
CERTIFICATE OF CORRECTION

Patent No. 3,673,326 Dated June 27, 1972

Inventor(s) Francis F. Lee

It is certified that error appears in the above-identified patent and that said Letters Patent are hereby corrected as shown below:

Column 1, line 12, "in" should be --is--.
Column 2, lines 5-15, the Table should read as follows:

| | | A,B | | | |
|---|---|---|---|---|---|
| | | 11 | 10 | 01 | 00 |
| $Y_1, Y_2$ ------ | 00 | 00 | 10 | 01 D=O | I D=O |
| | 01 | 00 | 01 C=O | 01 | 01 C=O |
| | 10 | 00 | 10 | 10 | 10 |
| | 11 | II | III | IV | V |

Column 2, line 63, "oo" should be --00--;
line 65, under column III, "00" should be --01--.
Column 3, line 69, "of" should be --or--.
Column 4, lines 5-15, the Table should read as follows:

| | | A,B 11 | 10 | 01 | 00 |
|---|---|---|---|---|---|
| $Y_1Y_2$ | 00 | 00 | 10 | 01 | 11 |
| | 01 | 00 | 01 | 01 | 01 |
| | 10 | 00 | 10 | 10 | 10 |
| | 11 | 00 | 01 | 10 | 11 |

Column 4, line 22, "($\overline{F\ \overline{Y_1}\ Y_2}$)" should be --($\overline{F\ Y_1\ \overline{Y_2}}$)--.
Column 5, lines 20-30, the Table should read as follows:

| | | A,B 11 | 10 | 01 | 00 |
|---|---|---|---|---|---|
| $Y_1Y_2$ | 00 | 00 | 10 | 01 | 00 |
| | 01 | 00 | 01 | 01 | 01 |
| | 10 | 00 | 10 | 10 | 10 |
| | 11 | 00 | 00 | 00 | 00 |

Column 6, line 75-column 7, lines 1-6, the Table should read as follows:

| $Y_1, Y_2$ | A,B 11 | 10 | 01 | 00 |
|---|---|---|---|---|
| 00 | 00 | 10 | 01 | I |
| 01 | 00 | 01 | 01 | 01 |
| 10 | 00 | 10 | 10 | 10 |
| 11 | II | III | IV | V |

Column 8, lines 20-29, the Table should read as follows:

| $Y_1, Y_2$ | A,B 11 | 10 | 01 | 00 |
|---|---|---|---|---|
| 00 | 00 | 10 | 01 | I |
| 01 | 00 | 01 | 01 | 01 |
| 10 | 00 | 10 | 10 | 10 |
| 11 | II | III | IV | V |

Signed and sealed this 12th day of December 1972.

(SEAL)
Attest:

EDWARD M.FLETCHER,JR.
Attesting Officer

ROBERT GOTTSCHALK
Commissioner of Patents